United States Patent [19]

Brown

[11] Patent Number: 4,496,302
[45] Date of Patent: Jan. 29, 1985

[54] APPARATUS FOR MOLDING PLASTIC ARTICLES

[75] Inventor: Paul Brown, Orangeville, Canada

[73] Assignee: Husky Injection Molding Systems Inc., Bolton, Canada

[21] Appl. No.: 385,064

[22] Filed: Jun. 4, 1982

[51] Int. Cl.³ .......................... B29D 1/00; B29F 1/14
[52] U.S. Cl. ...................................... 425/547; 249/63; 249/68; 425/556; 425/438; 264/318
[58] Field of Search ............... 425/438, 556, 552, 547; 249/63, 68

[56] References Cited

U.S. PATENT DOCUMENTS

| | | | |
|---|---|---|---|
| 3,737,277 | 6/1973 | Uhlig | 425/438 |
| 3,940,103 | 2/1976 | Hilaire | 425/438 |
| 4,399,092 | 8/1983 | Snow | 264/318 |

Primary Examiner—James Derrington
Attorney, Agent, or Firm—Karl F. Ross; Herbert Dubno

[57] ABSTRACT

In order to mold tamperproof bottle closures or other plastic articles having a threaded cap frangibly connected with an adjoining skirt which has a number of internal projections or spurs inclined in a transverse plane at approximately identical acute angles to its inner peripheral surface, a male mold portion has a core in the form of a stepped cylinder with a small-diameter part rotatably enveloped by a sleeve flush with an adjoining large-diameter part jointly defining an annular gap with a surrounding shell. The sleeve has recesses in the shape of undercut slots forming the internal projections of a skirt molded in that gap; after sufficient hardening, the shell is rotated to extract these projections from their recesses with resulting radial expansion of the skirt into an adjoining space from which the shell has been axially withdrawn. A stripper then detaches the body of the molded article by an axial thrust from the large-diameter core part while axially entraining the shell which bears upon the expanded skirt to help eject the article from the mold; the skirt, still connected with the body by a rupturable link, thereafter elastically regains its original shape as do the spurs internally projecting therefrom. Circulation of a cooling fluid through the interior of the core accelerates the hardening of the article prior to its ejection from the mold.

7 Claims, 9 Drawing Figures

APPARATUS FOR MOLDING PLASTIC ARTICLES

FIELD OF THE INVENTION

My present invention relates to an apparatus for integrally molding plastic articles having a thin-walled annular portion or skirt with a plurality of flexible internal projections inclined at substantially identical angles to its inner peripheral surface. A representative but by no means exclusive example of such an article is a tamperproof bottle closure with such a skirt frangibly attached to an internally threaded cap by narrow webs, the skirt carrying off-radial inner spurs designed to oppose an initial unscrewing of the cap from the complementarily threaded neck of a bottle. During such unscrewing, the friction between the ends of the spurs and the roughened neck surface of the bottle prevents these spurs from sliding over that surface and causes rupture of the webs with resulting detachment of the cap, thereby indicating to a subsequent user that the bottle has already been previously opened.

BACKGROUND OF THE INVENTION

Conventional techniques for molding internally threaded caps, involving extraction of the molded articles by an unscrewing motion, cannot be used with such closures because the spurs would oppose that motion and shear off during ejection from the mold.

Stripping such a molded closure off a core in its axial direction is equally unavailing since the spurs are held in axially confined undercut recesses of that core.

Possible prior-art solutions solutions include the use of collapsible cores (see, for example, U.S. Pat. No. 3,865,529), yet molds comprising such cores have a rather complex structure and also make it virtually impossible to expedite the setting of the molded article by the cooling of the inner cavity wall of a mold.

These drawbacks are overcome only in part by the provision of a divided core with interfitting sections that can be angularly displaced relative each other to form channels parallel to the axis of the mold for the withdrawal of internal projections of the molded article, e.g. as described in U.S. Pat. No. 3,584,111. Molds of this description, however, are suitable only for articles whose internal projections are sturdy enough to withstand an axial extraction from their recesses without excessive deformation.

OBJECTS OF THE INVENTION

The general object of my present invention, therefore, is to provide an improved apparatus for molding articles of the character here envisaged, such as tamperproof bottle closures, in an expeditious manner and without an unduly complex mold structure.

A related object is to provide a mode of ejection of such an article from its mold which preserves its integrity and avoids premature rupture of a frangible bridge connecting its hollow body or cap with its projection-carrying skirt.

A more particular object of my invention is to provide means in such an apparatus for facilitating the cooling of the molded article from within to expedite its setting.

SUMMARY OF THE INVENTION

In the practice of my invention I use a flowable plastic material, preferably polypropylene, which has a certain elasticity upon hardening into a solid though this elasticity need not be preserved after complete cooling to room temperature. The flowable material is introduced into a cavity of a mold which, in a mold-closed position, is bounded by a male and a female mold portion. The male mold portion includes a core centered on an axis and a relatively rotatable sleeve coaxially juxtaposed therewith, this sleeve being provided with a plurality of undercut recesses inclined at substantially identical acute angles to the outer sleeve periphery; advantageously, the core is a stepped cylinder having a small-diameter part enveloped by the sleeve and having a large-diameter part flush with and adjoining that sleeve. The latter, and preferably also a peripheral zone of the large-diameter part of the core, defines an annular gap with a surrounding shell included in the female mold portion; this gap is part of the mold cavity, as are the undercut recesses communicating therewith.

After the plastic material introduced into the cavity of the closed mold has set sufficiently to form a cohesive article whose hollow body adheres to the core while its skirt occupies the gap between the sleeve and the shell, the male and female mold portions are separated at least to an extent needed for exposure of the freshly molded shirt so as to facilitate its radial expansion when, at the beginning of an ejection phase, the sleeve and the core are relatively rotated to extract the molded projections or spurs from the recesses of the sleeve; the sense of this relative rotation must be such that the sleeve turns in the direction of divergence of its recesses from its outer periphery whereby those projections are deflected radially outward, coming to lie between the skirt and solid areas of the sleeve located between the recesses. This results in an elastic expansion of the skirt into the space vacated by withdrawal of the shell from its gap-defining position. When the mold portions have been completely separated from each other, which could occur before or after the projection-extracting sleeve rotation, the molded article is axially stripped from the male portion with sliding of the deflected projections over the sleeve and adjacent core parts; after full detachment of the article, the skirt and the projections resiliently regain the configurations and relative positions they originally had in the mold.

Although in principle the withdrawal of the shell from the region of the annular gap could be either radial (if the shell is split) or axial, an axial shift relative to the sleeve and core enables a reverse motion to effect or at least assist in the ejection of the article. This is particularly advantageous when the molded article is a tamperproof bottle closure of the type referred to whose cap is connected with the spur-carrying skirt by a frangible link formed with the aid of an annular shoulder on the core. The stripping of the article from the male mold portion at the end of the ejection phase is then preferably carried out by means of a thrust member engaging the cap itself, this member being linked via a lost-motion connection with the shell for axially entraining same relatively to the core while an end of the shell bears upon the expanded skirt to relieve the connecting link of any stress that could cause its premature rupture.

In order to expedite the setting of the molded article to the extent needed for the ejection operation, It prefer to provide the core with an internal channel connected to a source of cooling fluid. With the core and the sleeve made of a highly heat-conductive metallic material, direct contact therebetween will transmit the cooling effect of this fluid to the recesses and the gap of the mold cavity.

BRIEF DESCRIPTION OF THE DRAWING

The above and other features of my invention will now be described in detail with reference to the accompanying drawing in which.

SPECIFIC DESCRIPTION

Figure 1:
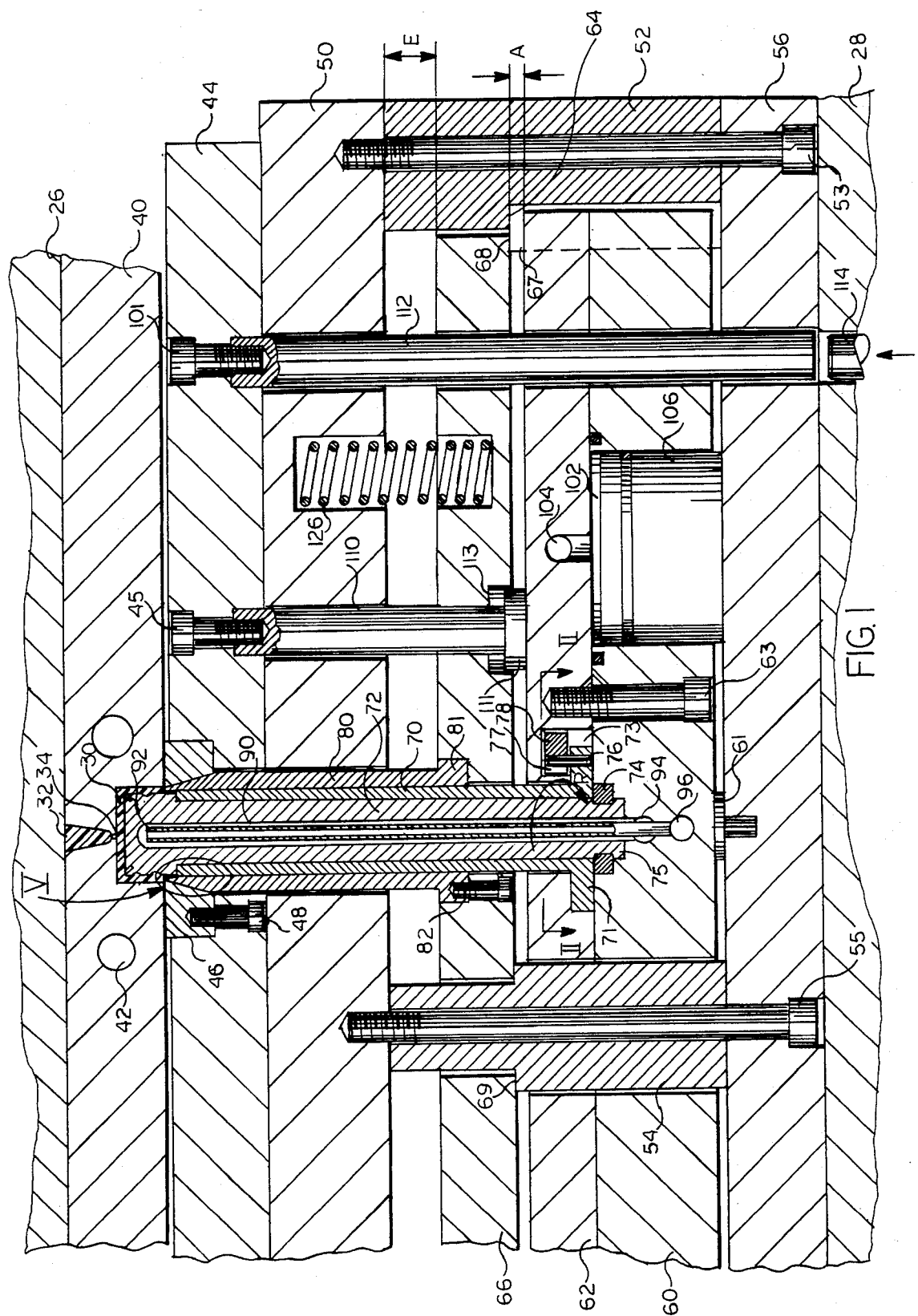
FIG. 1 is an axial sectional view of an apparatus for the injection molding of a tamperproof bottle closure according to my invention.

Reference will first be made to FIG. 1 showing a pair of platens 26, 28 of a conventional injection-molding machine not further illustrated, these platens respectively supporting coacting parts of a multicavity mold including a plate 40 on platen 26 and a stack of plates on platen 28, namely a stripper plate 44, a backing plate 50, a base plate 56, a primary ejector plate 60, a retainer plate 62 and a secondary ejector plate 66. It will be assumed that platen 28 is movable while platen 26 is stationary to simplify the connection of the mold cavities to a supply of hot, liquefied plastic material.

Figure 2:
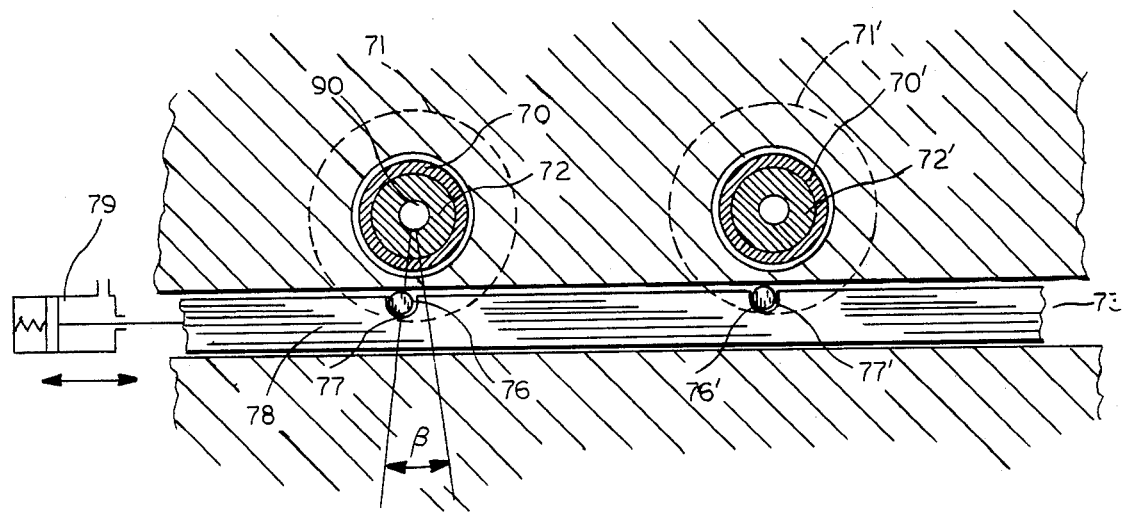
FIG. 2 is a fragmentary cross-sectional view taken on the line II—II of FIG. 1.

Plate 40 is formed with a plurality of such cavities 30 (only one shown) receiving the plastic material via respective runners 32 and injection gates 34. In the illustrated mold-closed position, in which plates 40 and 44 abut each other through the intermediary of stripper rings 46 (one per cavity) seated in plate 44, each cavity is bounded by a corresponding core 72 (see also FIG. 2) supported on plates 60, 62 as well as by other elements of the assembly carried on platen 28, including the associated stripper ring. These elements further include in each instance a sleeve 70, coaxially enveloping the core 72 with freedom of limited relative rotation, and a shell 80 coaxially surrounding the sleeve 70 with freedom of limited relative axial shifting. The end of shell 80 proximal to cavity plate 40 is spaced from the sleeve 70 and from the core 72 by a narrow annular gap 116 (see FIGS. 6-8), this gap forming an extension of the corresponding cavity 30 when the mold is closed. Thus, core 72 and sleeve 70 may be jointly referred to as a male mold portion while shell 80 can be defined together with plate 40 as a female mold portion coacting therewith. Further extensions of the cavity are constituted by undercut recesses 100 in sleeve 70, best seen in FIGS. 5-9, which have the form of triangular slots all inclined at the same acute angle $\alpha$ (FIG. 9) to the outer peripheral sleeve surface. Core 72 has the shape of a stepped cylinder with a small-diameter lower part or stem and a large-diameter upper part or head as viewed in FIGS. 5-8, the latter part being flush with the adjacent end of sleeve 70. For easier machining, the slots 100 open onto the annular end face of sleeve 70 adjoining the large-diameter part of core 72.

The several stripper rings 46 are fixedly secured by bolts 48 to plate 44 which could also be integral therewith. In the mold-closed position of FIG. 1, stripper plate 44 abuts the backing plate 50 which is pressed thereagainst by several coil springs 126 (only one shown) also bearing upon the secondary ejector plate 66. The latter then rests on shoulders 68 and 69 of internal ribs 67 of a peripheral ring 52 and of inwardly disposed pillars 54; the ring and the pillars are respectively penetrated by bolts 53 and 55 anchored to base plate 56. Ejector plate 60 and retainer plate 62, fixedly interconnected by bolts 63, have peripheral indentations engaged by the ribs 67 and are overhung by a shoulder 64 of peripheral ring 52. A certain minimum clearance is maintained between plates 56 and 60 by several spacer buttons 61. Other bolts 110 are attached to stripper plate 44 by counterbolts 45 and have heads 111 received with axial clearance in recesses 113 of plate 66, thus constituting a lost-motion connection between these two plates.

Shell 80 has a flange 81 engaged by a bolt 82 which fastens it to plate 66. A similar flange 71 of sleeve 70 is received in a recess of plate 62 communicating with a channel 73 in that plate; a bar 78 slidably lodged in channel 73 has a notch 77 engaged by a pin 76 rising from flange 71. Bar 78 is coupled with a spring-loaded piston of a pneumatic cylinder 79, see FIG. 2, by which the bar can be reciprocated over a limited distance causing rotation of sleeve 70 relative to core 72 by a small angle $\beta$ of, say, 15° (see also FIG. 9); another notch 77' of bar 78 similarly coacts with a pin 76' rising from a flange 71' of a sleeve 70' which envelops a core 72' associated with another cavity of plate 40. Each core is nonrotatably held in ejector plate 60 with the aid of a respective split ring 74 as illustrated for core 72 in FIG. 1. Bar 78 and pins 76, 76' could be replaced by some other mechanism, e.g. a rack coacting with gear teeth on flanges 71, 71'.

As further seen in FIG. 1, cavity plate 40 has channels 42 for the circulation of a cooling fluid such as water. Similar channels 94 and 96 in plate 60 respectively communicate with a central bore 90 of core 72 and with a tube 92 of smaller diameter extending with clearance within that bore whereby the core can be cooled over virtually its entire length by the circulating fluid.

Plate 60 has at least one cylindrical opening 102 communicating with a conduit 104 in plate 62 through which air or some other pressure fluid can be admitted into that opening to act upon a piston 106 resting against plate 56. A gap of small width A, existing in the position of FIG. 1 between plates 62 and 66, is eliminated by such pressurization which drives the plates 60, 62 and 44 forward with reference to plates 50 and 56 until plate 62 comes into contact with the plate 66 which abuts the shoulder 68. This same motion cancels the play of bolt head 111 in recess 113.

A stud 112 (representative of several such studs distributed along the mold periphery) is fastened by a bolt 101 to stripper plate 44 and freely traverses all the other plates supported on platen 28. Stud 112 confronts an ejector pin 114 which is displaceable by the mold drive, at the end of a mold-opening stroke, to eject the molded articles from the respective cavities 30 as more fully described hereinafter with reference to FIGS. 5-8.

Figure 3:
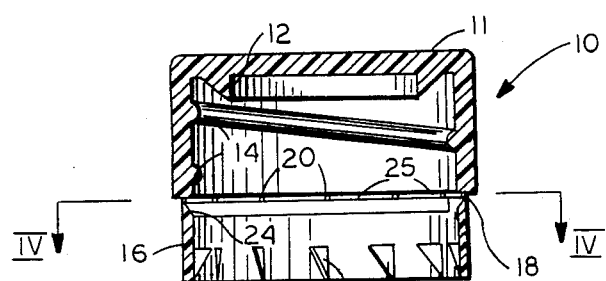
FIG. 3 is an axial sectional view of a bottle closure molded with the apparatus of FIGS. 1 and 2.
Figure 4:
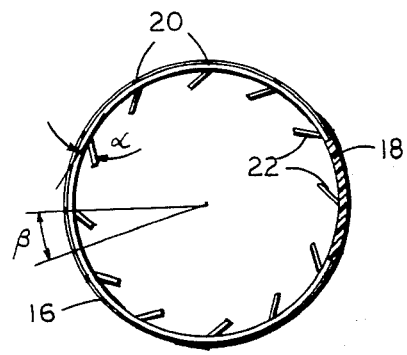
FIG. 4 is a cross-sectional view of the article of FIG. 3, taken on the line IV—IV thereof.

FIGS. 3 and 4 illustrate such an article 10, specifically a bottle closure comprising a cap 11 with a lip seal 12 and internal threads 14 complementary to those on the neck of a bottle to which it is to be attached in a tamperproof manner as discussed above. Cap 11 is integrally linked with a thin-walled skirt 16 by a frangible connection formed from a multiplicity of peripherally spaced narrow webs 20 rising from a beveled zone 24 and by a bridge 18 of the same thickness as the skirt, that bridge extending over an arc of approximately 60°; the webs 20 are separated by peripheral slots 25. The skirt is internally provided, at a level below the bridge 18 and the webs 20, with a multiplicity of peripherally equispaced pennant-shaped spurs 22 inclined to its inner wall surface at the aforementioned angle α, shown to equal about 45°. The pitch of thread 14 and the angular orientation of spurs 22 are so chosen, in a manner well known per se, that the spurs are deflected toward the inner skirt surface when the cap 11 is screwed onto the bottle neck by a clockwise rotation as viewed in FIG. 4. Upon subsequent unscrewing in the counterclockwise direction, however, the spurs 22 bite into the roughened neck surface of the bottle (which usually also consists of plastic material) so as to prevent the skirt 16 from following the rotation of the cap. As the user continues to turn the cap, the webs 20 and the bridge 18 are ruptured whereby the skirt breaks away from the cap. After the cap has been unscrewed, the skirt can be pulled off the neck of the bottle.

From FIG. 4 it will be noted that the spurs 22, when flattened against the skirt periphery, extend nonoverlappingly over not more than half the arc separating their points of attachment; with 12 spurs, as shown, each spur remains well within the aforementioned angle of rotation β upon being deflected outward after molding as described hereinafter.

Figure 5:
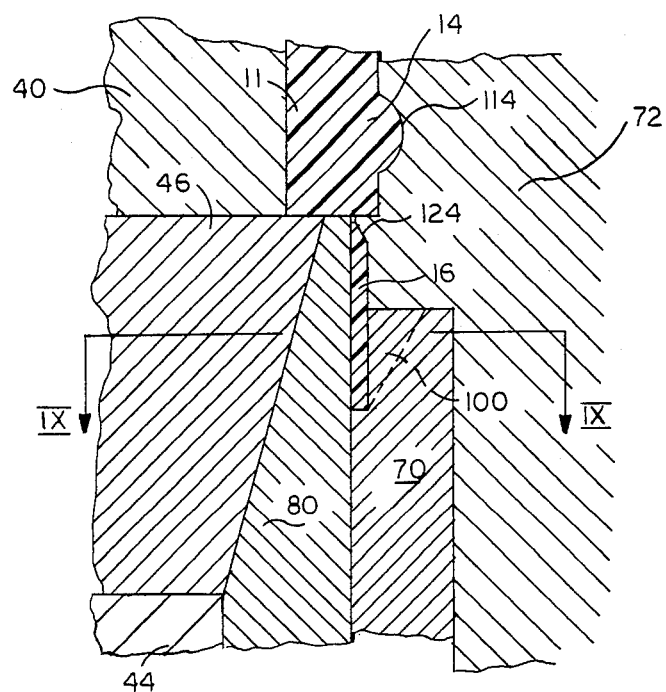
FIG. 5 is a sectional detail view, drawn to a larger scale, of an area indicated at V in FIG. 1.
Figure 6:
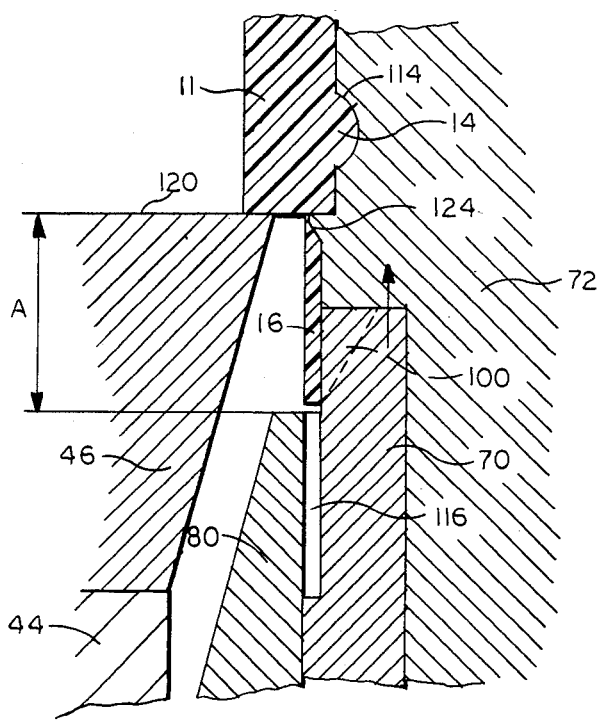
FIGS. 6-8 are views similar to FIG. 5, showing different positions of coacting mold portions in successive stages of an ejection operation.
Figure 7:
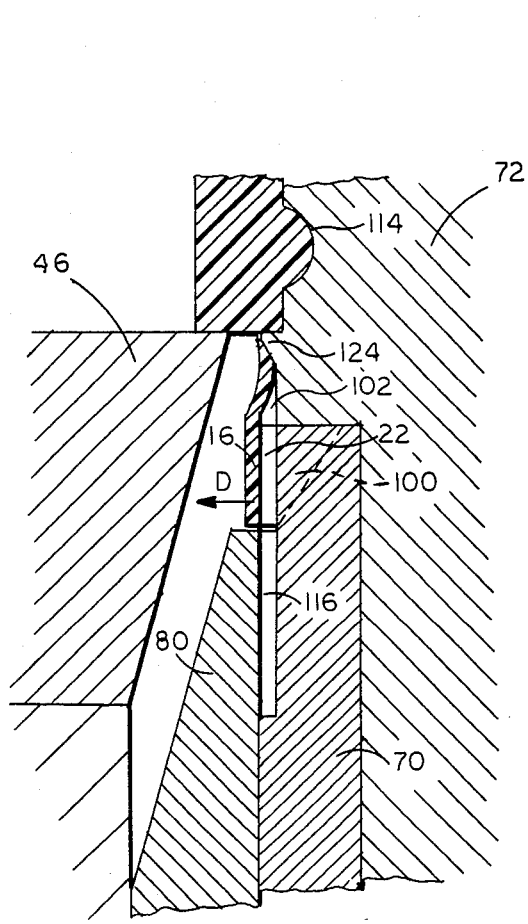
Figure 8:
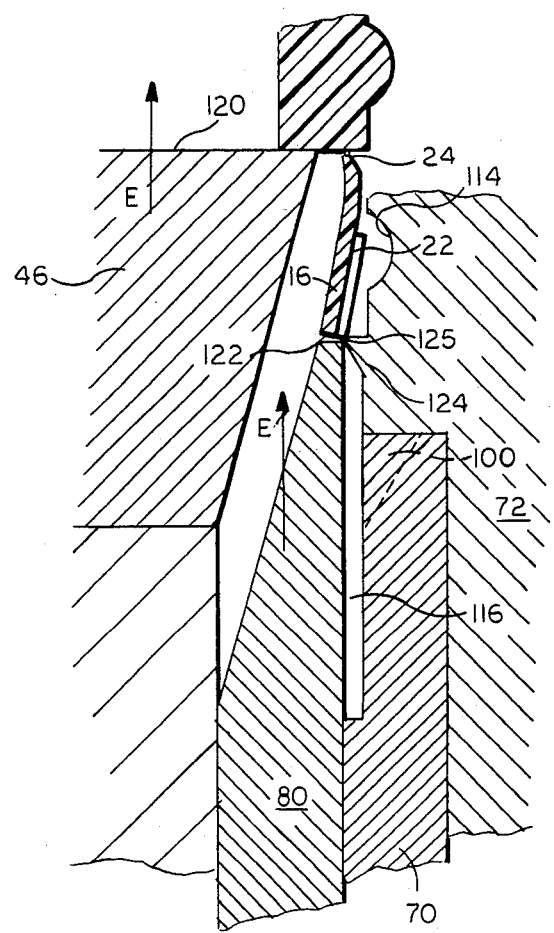
Figure 9:
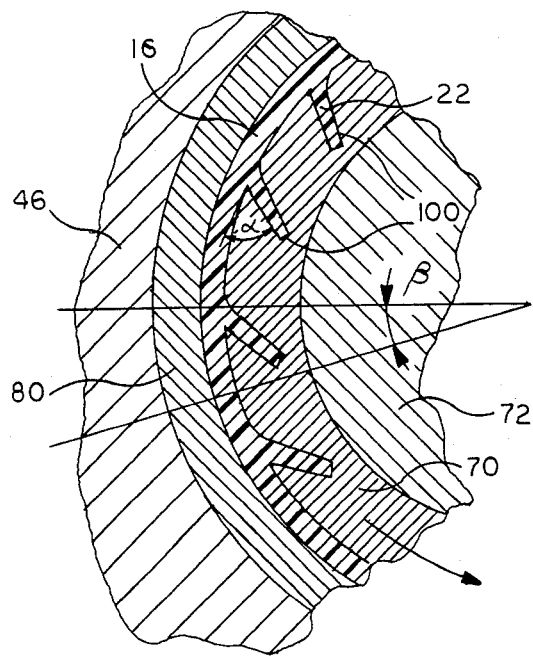
FIG. 9 is a fragmentary cross-sectional view taken on the line IX—IX of FIG. 5.

As will be apparent from FIGS. 5–9, skirt 16 is molded within the gap 116 separating the sleeve 70 and the adjoining head of core 72 from shell 80 in the mold-closed position shown in FIGS. 1, 5 and 9 while the spurs 22 are formed in the slots 100 of sleeve 70 communicating with that gap. The constriction 24 of FIGS. 3 and 4 is produced by a beveled shoulder 124 on that large-diameter core portion which extends over about 300° and in the mold-closed position of FIG. 5 projects toward the encircling shell 80; except for small notches 125 (see FIG. 8) designed to form the webs 22 of FIGS. 3 and 4, shoulder 124 contacts the shell at the level of the end face 120 of stripper ring 46 to produce the slots 25. FIGS. 5–8 further show that the head of core 72 has a helical groove 114 designed to form the thread 14 of the cap 11 to be molded. This groove 114 has a relatively shallow arcuate cross-section enabling the axial stripping of the cap from the core.

The height of the skirt 16 shown in FIG. 5 corresponds to the distance A between plates 62 and 66 indicated in FIG. 1. When the molded article has sufficiently solidified, cavity plate 40 is removed by a separation of platens 26 and 28 from each other in a mold-opening stroke (FIG. 1). Substantially concurrently therewith, pressure fluid is admitted into the cylinder 102 of plate 60 with elimination of the gap A, as described above, to establish the position of FIG. 6 in which shell 80 is axially shifted relatively to stripper plate 44, sleeve 70 and core 72 to withdraw the free end of that shell from the plane of the end face 120 of ring 46 by the same distance A so as to expose the newly formed skirt 16. Next, cylinder 79 (FIG. 2) is pressurized to rotate all the sleeves 70, 70' . . . in a counterclockwise sense about their respective cores 72, 72' . . . through the aforementioned angle β, whereby the spurs 22 are extracted from the respective slots 100 which preferably have a slight draft to facilitate such extraction; as will be noted from FIG. 9, the entrances of slots 100 are somewhat flared to prevent the spurs 22 from being sheared off at their roots. The rotation of sleeve 70 relative to the molded article, whose cap still adheres to the head of core 72, occurs in the direction of divergence of the spurs 22 from skirt 16 as will be readily apparent from FIG. 9. Since the skirt is no longer confined by the shell 80, it is now free to expand radially outward as the spurs flatten themselves against its inner surface (arrow D, FIG. 7). Thus, the free edge of the skirt (indicated at 122 in FIG. 8) confronts the end face of the retracted shell 80 even as the deflected spurs 22 come to lie against the solid peripheral areas of sleeve 70 separating its slots 100.

At this stage the ejector pins 114 (FIG. 1) are advanced by the machine drive to separate the stripper plate 44 from its backing plate 50, with entrainment of ejector plate 66 via pins 110 against the force of springs 126 to close a gap E (much wider than gap A) previously existing between plates 50 and 66. Shell 80, advancing with plate 44, bears upon the skirt edge 122 while the face 120 of stripper ring 46 engages an overhanging edge of cap 11 to detach it from the head of core 72. This joint displacement of stripper ring 46 and shell 80, illustrated at E in FIG. 8, prevents any excessive stretching of the expanded skirt 16 during the ejection operation. After the skirt has cleared the core 72, it elastically regains its previous shape while the spurs 22 return to their original inclined position.

When the pins 114 are withdrawn at the end of the ejection phase, springs 126 again drive the plates 50 and 66 apart by the distance E.

After the venting of cylinders 79 and 102 (with restoration of the original angular position of sleeves 70, 70' . . .), and upon the subsequent reclosure of the mold, plates 60 and 62 are pushed back with the aid of bolts 110 toward base plate 56 to re-establish the gap A. Another injection can now take place.

I claim:

1. An apparatus for integrally molding a plastic article having a hollow body and an adjoining skirt provided with a plurality of internal projections inclined in a transverse plane at similar acute angles to an inner periphery of the skirt, comprising:

a mold with a male and a female portion relatively displaceable between a mold-closed and a mold-open position, said portions defining in said mold-closed position a cavity connected to a supply of flowable plastic material hardenable into an elastic solid, said cavity including an annular gap centered on an axis and bounded by a sleeve forming part of said male portion and by a surrounding shell forming part of said female portion, said male portion further including a core coaxial with said sleeve, said cavity further having extensions formed by undercut recesses in an outer periphery of said sleeve open toward said gap and inclined at substantially identical acute angles to said outer periphery;

drive means coupled with said male and female portions for alternately establishing said mold-open and mold-closed positions, with full exposure of a molded article adhering to said male portion in said mold-open position while a skirt of a molded article embraces said sleeve with internal projections respectively molded in said recesses; and ejection means synchronized with said drive means for rotating said sleeve relatively to said core in the direction of divergence of said recesses from said outer periphery to extract molded projections from said recesses and to deflect molded projections so extracted toward the inner periphery of a skirt embracing said sleeve with resultant elastic radial expansion of such a skirt, said ejection means including a stripper operable to exert upon the expanded skirt an axial thrust removing the molded article from said male portion.

2. An apparatus as defined in claim 1 wherein said stripper is engageable with a body of a molded article directly adhering to said core and is linked with said shell by a lost-motion connection for axially entraining said shell relatively to said core in a position of engagement of an end of said shell with the expanded skirt to assist in the removal of a molded article.

3. An apparatus as defined in claim 2 wherein said cavity has a section wider than said gap bounded in part by said stripper in the mold-closed position, said core being provided with an annular shoulder approaching said shell and defining therewith a constriction between said gap and said wider section in said mold-closed position for producing a frangible connection between a body and a skirt of a molded article.

4. An apparatus as defined in claim 3 wherein said core has a shallow helical groove open to said wider section for providing a body of a molded articles with an internal thread.

5. An apparatus as defined in claim 1, 2, 3 or 4 wherein said core is provided with an internal channel connected to a source of cooling fluid, said sleeve being in direct contact with said core for transmitting the cooling effect of said fluid to said recesses and said gap.

6. An apparatus as defined in claim 3 or 4 wherein said core is a stepped cylinder having a small-diameter part embraced by said sleeve and having a large-diameter part flush with said sleeve, said shoulder being carried on said large-diameter part.

7. An apparatus as defined in claim 6 wherein said recesses are generally triangular slots open at an end of said sleeve adjoining said large-diameter part.

* * * * *